United States Patent [19]

Brown et al.

[11] Patent Number: 5,327,487
[45] Date of Patent: Jul. 5, 1994

[54] FACSIMILE APPARATUS AND METHOD FOR USE WITH CUSTOMER SWITCHING SYSTEM

[75] Inventors: Sanford S. Brown, Lincroft; Mark A. Crandall, Belford; Harvey S. Schultz, Manalapan, all of N.J.

[73] Assignee: AT&T Bell Laboratories, Murray Hill, N.J.

[21] Appl. No.: 822,806

[22] Filed: Jan. 21, 1992

[51] Int. Cl.⁵ .......................................... H04M 11/00
[52] U.S. Cl. .................................... 379/100; 379/93; 379/94; 379/212
[58] Field of Search ............... 379/100, 93, 94, 96, 379/97, 98, 201, 211, 212, 102, 209, 210; 358/404, 402, 407, 434, 435, 436, 438, 439, 440

[56] References Cited

U.S. PATENT DOCUMENTS

| | | | |
|---|---|---|---|
| 4,331,983 | 5/1982 | Burton et al. | 379/100 |
| 4,785,355 | 11/1988 | Matsumoto | 379/100 |
| 4,833,705 | 5/1989 | Kobayashi | 379/100 |
| 4,916,732 | 4/1990 | Kotani et al. | 379/100 |
| 4,939,767 | 7/1990 | Saito et al. | 379/100 |
| 4,995,073 | 2/1991 | Okata et al. | 379/94 |
| 5,018,189 | 5/1991 | Kurosawa et al. | 379/100 |
| 5,027,385 | 6/1991 | Nakagawa et al. | 379/212 |
| 5,056,132 | 10/1991 | Coleman et al. | 379/100 |
| 5,062,133 | 10/1991 | Melrose | 379/102 |
| 5,142,525 | 8/1992 | Nakatsuma | 379/209 |
| 5,177,620 | 1/1993 | Fukushima | 358/404 |

OTHER PUBLICATIONS

"FAX Digital Facsimile Technology & Applications", Kenneth R. McConnell, Dennis Bodson and Richard Schaphorst, pp. 40-49.

Primary Examiner—Curtis Kuntz
Assistant Examiner—Jason Chan
Attorney, Agent, or Firm—John A. Caccuro

[57] ABSTRACT

A facsimile (fax) machine is arranged to automatically answer a call and to transmit a fax message if a document or stored message is awaiting transmission, otherwise the fax machine goes into a fax receive mode. In another arrangement, the fax machine is connected to a station port of a customer switching system such that an existing call at a system station set can be transferred to the fax machine when a fax message is to be transmitted or received as part of that call. In one embodiment a station set and fax machine are packaged together in one housing.

32 Claims, 4 Drawing Sheets

5,327,487

FACSIMILE APPARATUS AND METHOD FOR USE WITH CUSTOMER SWITCHING SYSTEM

TECHNICAL FIELD

The present invention relates to facsimile machines and, more particularly, to a facsimile machine for use behind a customer switching system.

BACKGROUND OF THE INVENTION

Most facsimile (fax) machines are arranged to interface directly to facilities of the public telephone network. When a fax machine is utilized behind a key system or private branch exchange (PBX) system, a special interface is usually required to enable the fax machine to communicate using the proprietary protocol of the key/PBX system. In such an arrangement, the fax machine is not integrated into the key/PBX system operation, but merely uses the key/PBX as a conduit to access the public facilities. This type of arrangement requires that the user go to the fax machine location to initiate or receive fax transmissions.

While such an arrangement provides key/PBX users with a fax capability, undesirably the fax machine is not fully integrated with the key/PBX system operation.

SUMMARY OF THE INVENTION

In accordance with the present invention, a facsimile (fax) machine is arranged to automatically answer an incoming call and, without either first sending a Digital Identification Signal (DIS) or receiving a Digital Transmit Command (DTC) signal, transmit a fax message if it detects that one is waiting to be transmitted therefrom. By comparison, in the prior art a fax machine could only answer an incoming call and transmit a fax message when being polled. When being polled, the fax machine must first send the DIS signal and then must receive a DTC signal from the polling location prior to transmitting a fax message. The fax message may be a message stored in a memory unit of the fax machine or may be a document, in the automatic document feeder, waiting to be transmitted. When the fax machine answers an incoming call and no message is awaiting transmission, the fax machine goes into the standard fax receive mode.

In one application, the fax machine is connected as an adjunct terminal of a customer switching system (e.g. a Key system, Private Branch Exchange (PBX) or Centrex system). In this arrangement, a station set of the system is utilized to originate a fax call and then transfer the call to the fax machine. When the fax machine answers the transferred call, if a message or document is present a fax message is transmitted, otherwise a fax message is received.

DETAILED DESCRIPTION

In the following description, the first digit of an element's reference number designates the figure where the element is first located (e.g., fax machine 103 is located in FIG. 1).

Figure 1:
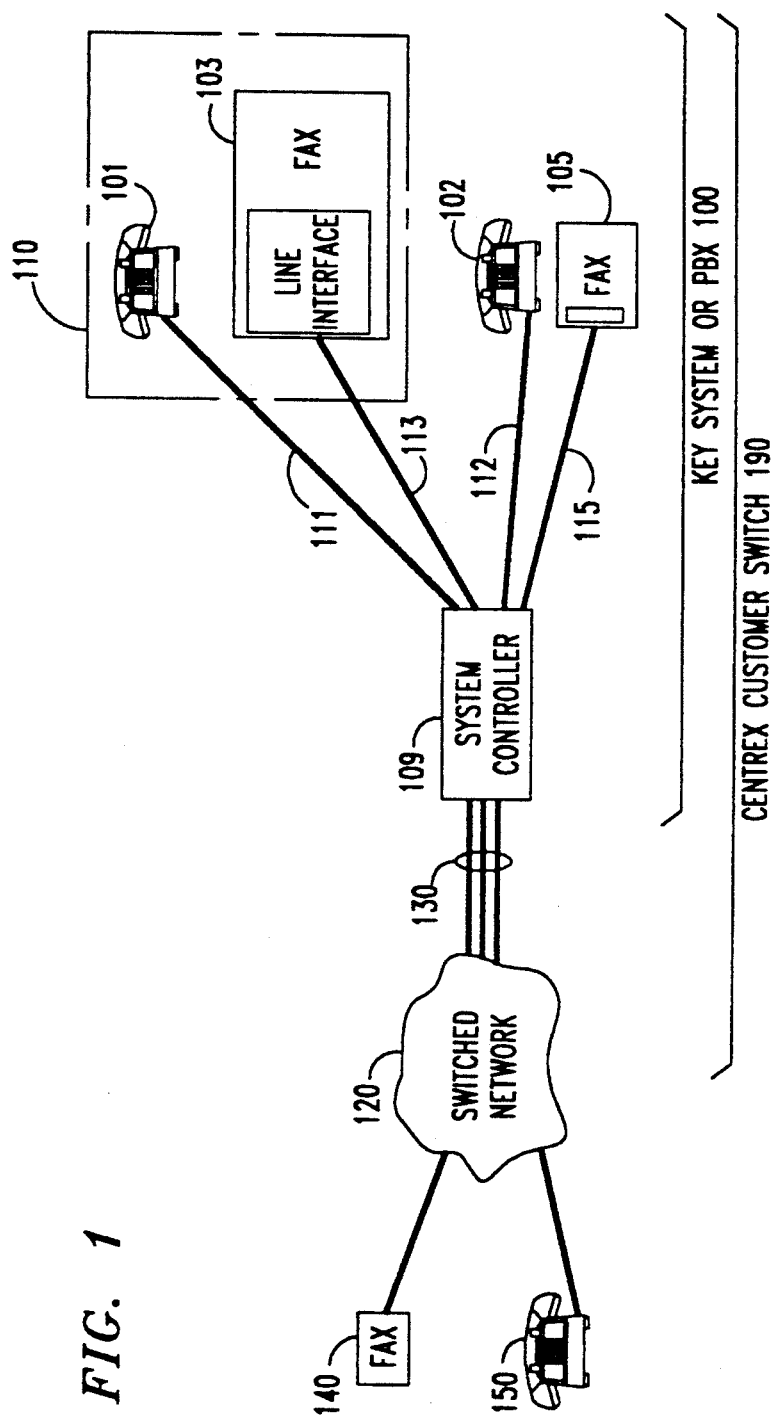
FIG. 1 shows a block diagram of a communication network useful in describing the present invention.

Shown in FIG. 1 is a block diagram of an illustrative customer switching system (e.g., a key system, PBX 100 or centrex customer switch 190) in which the present invention may be utilized. In the drawing, the key/PBX system 100 connects via a plurality of phone lines or trunks 130 to a switched telephone network 120. Network 120 is also shown, illustratively, connected to station set 150 and fax machine 140.

System 100, illustratively, includes a controller unit 109, having station ports which connect via lines 111, 112, 113 and 115 to station sets 101 and 102 and fax machines 103 and 105. According to one aspect of the present invention, station set 101 and facsimile machine 103, as will be described in detail in a later paragraph, may share a common housing 110. In system 100 each of the lines 111-115 may include one or more pairs of wires to interconnect system 100 to station sets 101 and 102 and fax machines 103 and 105. For example, in the well-known Merlin ® communication system, each of the telephone lines 111-113 include separate pairs of wires for voice, power and control. (Merlin is a registered trademark of AT&T). A line interface, which is part of station sets 101 and 102 (see 311 of FIG. 3) and facsimile machines 103 and 105 (see 210 of FIG. 2), makes system 100 signaling compatible with the signaling of these units.

Switched Network 120 is also shown, illustratively, connected to station set 150 and fax machine 140.

Figure 2:
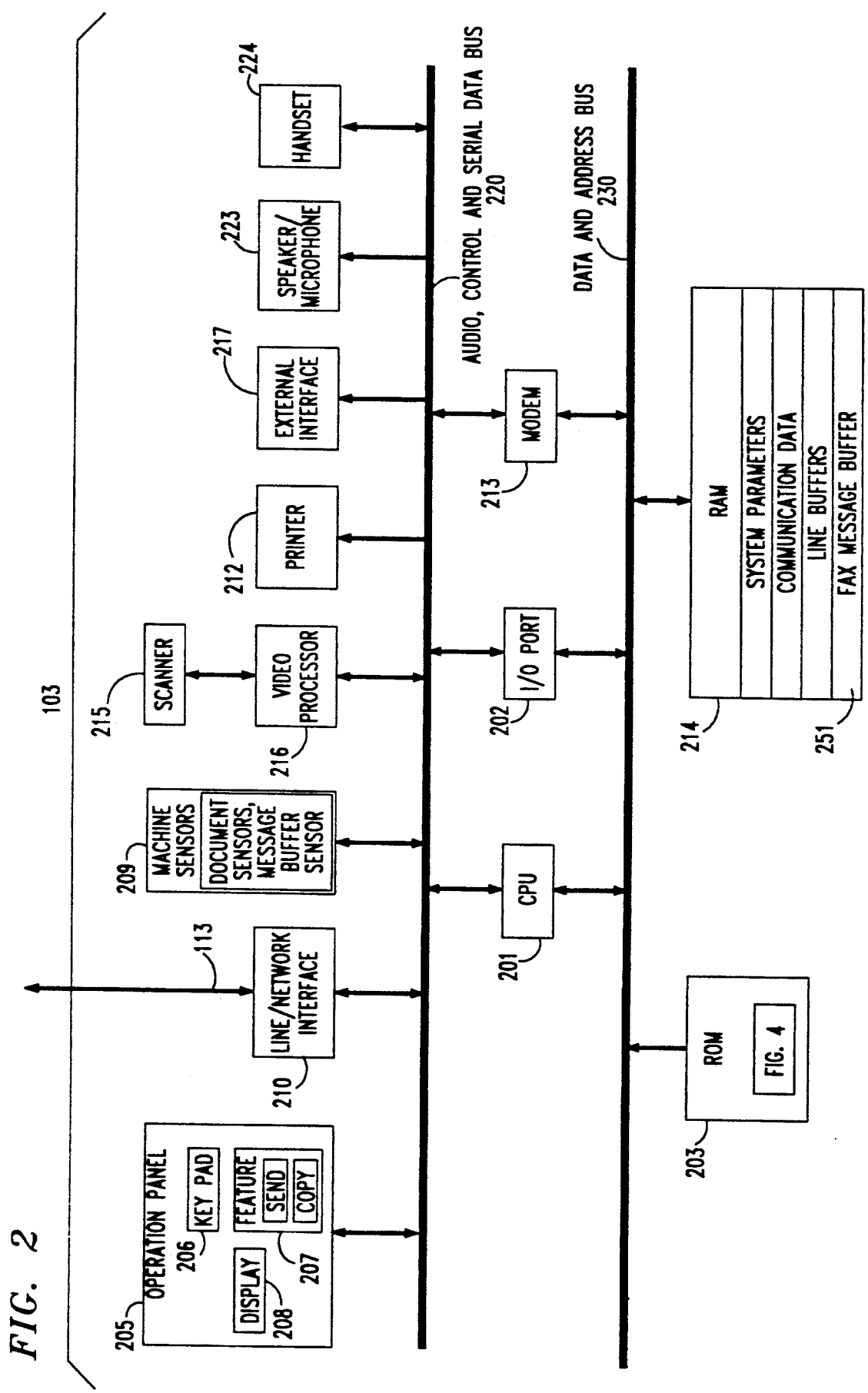
FIG. 2 shows a block diagram of a facsimile machine in accordance with the present invention.

Shown in FIG. 2, is a well-known block diagram of fax machine 103 modified in accordance with the present invention. The Central Processing Unit (CPU) 201 operates under program control to control the operations of facsimile machine 103. The CPU 201 controls facsimile machine 103, either directly over audio, control, and serial data bus 220 or through the I/O Port 202. CPU 201 controls facsimile machine 103 by communicating in a well-known manner, with operation panel 205, line/network interface 210, machine sensors 209, video processor 216, printer 212, optional external interface 217 (printer, computer, etc.) as well as I/O port 202 and modem 213 over control and serial data bus 220. Handset 224, speaker/microphone 223 and key pad 206 may, optionally, be included and utilized to originate or receive voice or fax calls from fax machine 103.

Figure 4:
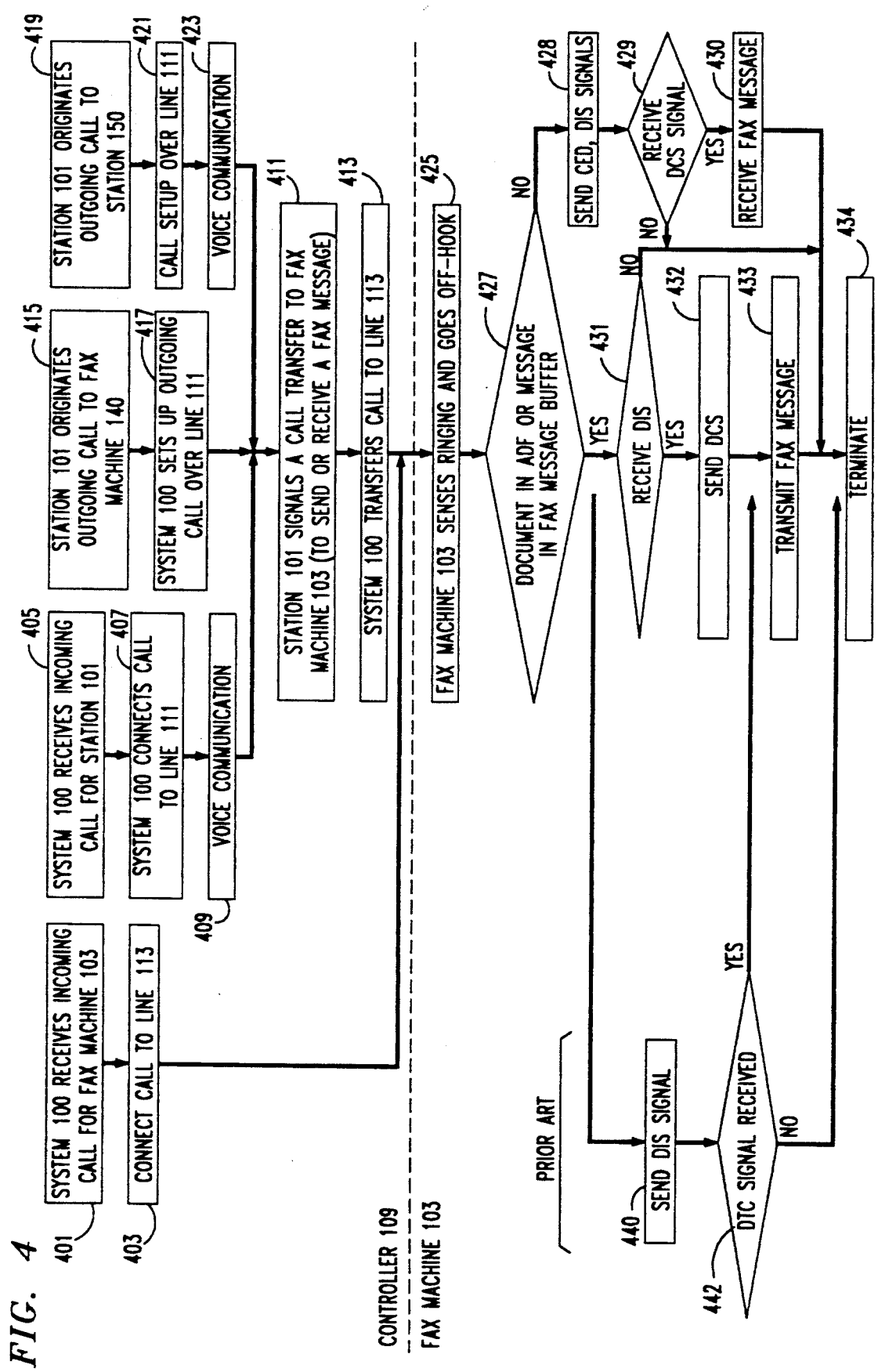
FIG. 4 shows a flow diagram of the operation of the present invention.

The Read Only Memory (ROM) 203 contains the system software, or programs utilized by CPU 201 to perform the standard facsimile functions as well as the features of the present invention, as shown in FIG. 4. Random Access Memory (RAM) 214 contains memory for storing system parameters and encoded communication data and line buffers for passing unencoded data. The RAM 214 may also include a fax message buffer 251 which stores a previously entered user fax message waiting to be transmitted to another fax machine. CPU 201 communicates, in a well-known manner, with ROM 203, RAM 214, I/O port 202, and modem 213 via data and address bus 230.

The Operation Panel (OP) 205 may optionally include keypad buttons 206 to originate fax or voice calls, and one or more feature buttons 207, such as, illustratively, send, copy, and optional repertory dial buttons (not shown). Activation of these feature buttons and keypad buttons enables the user to enter input commands or requests to CPU 201. For example, operating the send key enables the sending of a fax document, while pressing the copy key enables the fax machine to perform a copier function. The operation panel 205 may optionally include a display 208 to provide output status messages to the user, typically using a Liquid Crystal Display (LCD). The display 208 may also include one or more Light Emitting Diodes (LEDs) to display various features or machine status. Output status messages can also be communicated through audible or voice messages transmitted through a speaker 223 or telephone handset 224.

Machine sensors 209 may include devices (e.g., photointerrupt sensors, reflective photosensors, switches, etc.) which may detect status or error conditions such as original document jam, paper jams, paper cutter jams or cover-open condition. These devices, in accordance with the present invention, include a sensor to detect the existence of a fax message awaiting to be transmitted from fax machine 103. This sensor may be a document sensor to detect the existence of a document in the automatic document feeder (ADF) and/or a message buffer sensor to detect the existence of a message in the fax message buffer 251. Alternatively, the message buffer sensor may be a status bit in RAM 214, which is checked by CPU 201 to determine if a message is present in fax message buffer 251.

Line interface 210 couples facsimile data from line 113 to and from controller 109. Line interface 210 enables fax machine 103 to be connected as a terminal or adjunct to a station port of controller 109 of system 100. Interface 210 also converts the system communication protocol to a format required by other elements of fax machine 103.

The printer 212, (e.g., a thermal head printer) is used to print facsimile messages or images on a paper medium. These images result from facsimile data which arrives via system 100. An external device, such as a printer or computer, (not shown) can be connected via interface 217 and utilized by facsimile machine 103 for outputting or receiving fax images.

Facsimile machine 103 generates a hard copy image of received facsimile data, i.e., facsimile messages, using printer 212, in a well-known manner as briefly described hereinafter. In a well-known manner, this facsimile data is coupled through network interface 210, demodulated by the modem 213, passed through the RAM 114 communication memory, decoded by the CPU 201, stored in the RAM 214 buffer memory, and sent to printer 212 for printing.

Facsimile images are transmitted from facsimile machine 103 in the standard manner. The scanner 215 senses image data from the document to be transmitted and converts it to analog signals. The video processor 216 converts these analog facsimile signals to digital facsimile data. These data are processed through the I/O port 202, where they are passed to CPU 201 via the RAM 214 buffer memory. The CPU 201 sends the data to modem 213 via the RAM 214 communication data memory. The data is sent from modem 213 through line interface 210 to controller 109.

Figure 3:
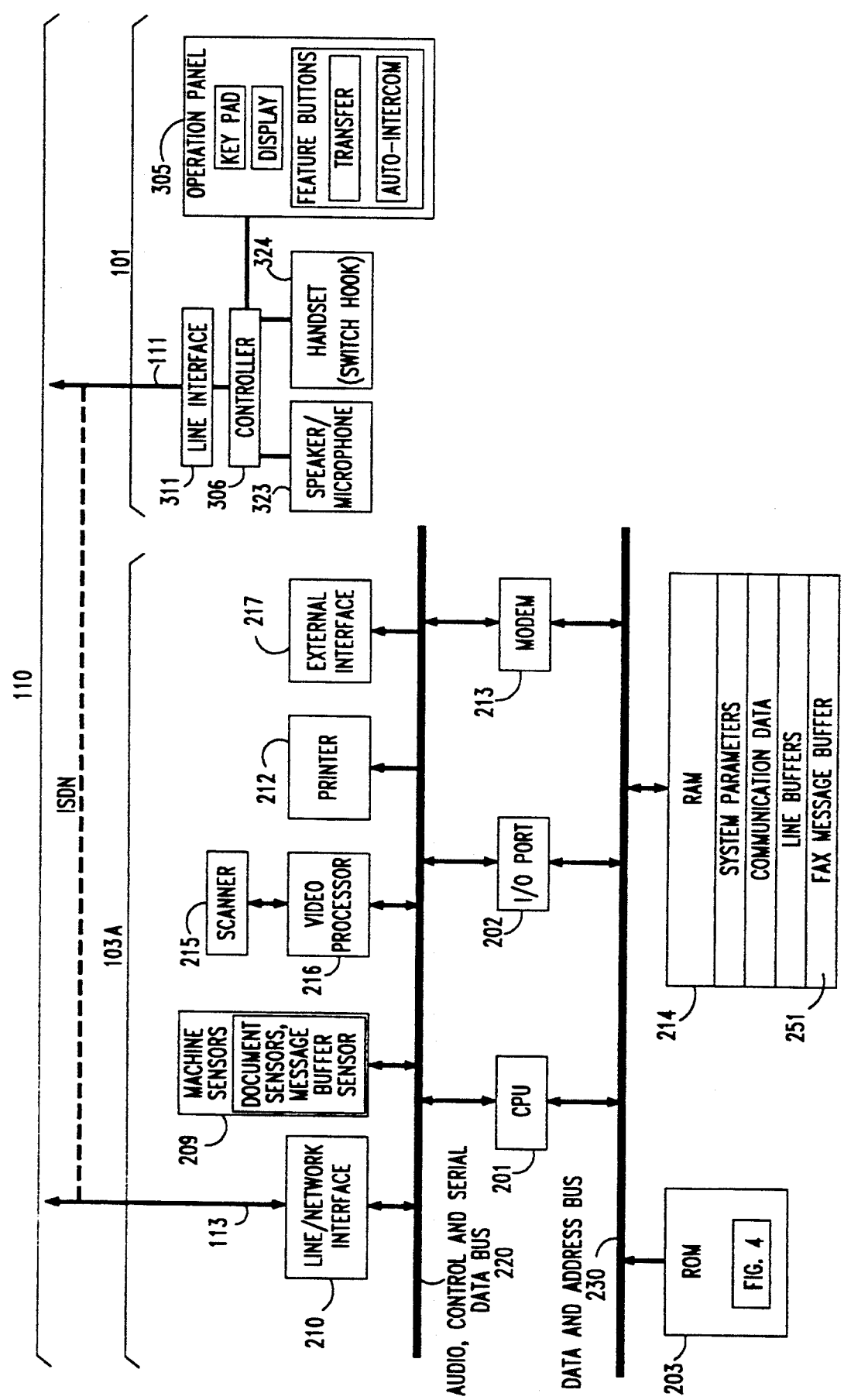
FIG. 3 shows an embodiment of a station set and fax machine combination unit in accord with another aspect of the present invention.

According to one aspect of the present invention, as shown by 110 in FIG. 1, the fax machine 103 and station set 101 may be packaged together as part of a station set/fax unit. With reference to FIG. 3, in such an arrangement the station set 101 would include the speaker/microphone 323, handset 324, station set operation panel 305 and line interface 311 which operate under control of controller 306. Controller 306 controls the communications between station set 103 and controller 109, over line 111, in a conventional manner. In this station set/fax unit 110, since station set 101 includes the functional units such as speaker, handset and operation panel, these units need not be provided in fax machine 103A.

The feature buttons of panel 305 include buttons which enable various well-known telephone features. One such button, the transfer button, when activated, enables an existing call to be transferred to another line designated (i.e., dialed) by the user. In accordance with the present invention, a transfer button activation followed by the user dialing a line connected to fax machine. 103A causes controller 306 to treat the transfer button as a send button operation for fax machine 103A. According to another aspect of the invention, the function of activating the transfer button and dialing an extension number may be combined and require only the activation of a single button. An example of this is the Merlin communication system Auto-Intercom feature which provides an auto-dialed internal call to the facsimile machine. A feature button which provides this feature is shown on the operation panel 305. Following one of the above described operations, fax machine 103A is placed in the send mode (i.e., transmit mode) although as will be described in a later paragraph, the fax machine 103A, in accordance with the present invention, enters the transmit mode only if a document is present in the feeder and enters the receive mode if no document is present.

Other feature buttons in operation panel 305 include various station set feature buttons as well as the copy button and other buttons typically present on operation panel 205 of stand-alone fax machine 103. The display unit of operation panel 305 may likewise include the display normally present on station set 101 and fax machine 103A.

The telephone/fax unit 110 is also shown to utilize a separate line 111 for station set 101 and a separate line 113 for facsimile machine 103A. In another embodiment, these separate lines 111 and 113 may be separate channels of a common facility. For example, in an Integrated Service Digital Network (ISDN) environment, line 111 may be one channel and line 113 another channel.

Using the figures and description of this specification as a guide, the operations of the present invention are integrated into the hardware and program structure of facsimile machine 103 so as to compatibly cooperate with other features and operations of facsimile machine 103.

With joint reference to FIGS. 1, 2, and 4 we describe the operation of the present invention. Briefly, the present invention enables fax machine 103 to sense a ringing line, go off-hook (step 425) and determine whether to transmit or receive a fax message by the status of the Automatic Document Feeder (ADF) or fax message buffer (step 427). According to the present invention, if a fax message (in document or electronic form) is waiting to be transmitted, the fax machine 103 goes into the fax transmit mode (step 431). When fax machine 103 goes off-hook, the fax transmit mode operates like any conventional fax machine which had originated a fax call except, in accordance with the present invention, it does not have to first dial up the party to receive the fax message (as do conventional fax machines), since the connection to the other party has already been established by system 100. As will be described in more detail later, the connection has been established because system 100 has either received an incoming call or has originated a call and is now transferring that call to the fax machine 103.

In step 427, if no fax message is found waiting to be transmitted, then when fax machine 103 goes off-hook it goes into receive fax message mode (step 429). The fax receive mode of the present invention operates in the same manner as a conventional fax machine, that is, when it goes off-hook on a ringing line it prepares to receive a fax message.

Shown in steps 401 through 423 are the four basic ways that system 100 can establish a fax connection between fax machine 103 and an external fax machine 140.

In a first mode, system 100 may receive an incoming fax call (e.g., from fax machine 140) for fax machine 103, as shown in step 401. In step 403, system 100 connects the incoming call to line 113. In step 425, fax machine 103 detects ringing and goes off-hook. In step 427, fax machine 103 checks if a document is located in ADF or if a message is located in fax message buffer. Since, in our example, we assumed that system 100 is receiving a fax call, no document is present in ADF and/or no fax message exists in fax message buffer 251 waiting to be transmitted. Thus, system 100 goes into the receive fax mode as shown in step 429. Fax message reception then proceeds in the standard manner. Thereafter, in step 434 the process terminates.

In a second mode, system 100 receives an incoming voice call (e.g., from station set 150) for station 101, as shown in step 405. In step 407, system 100 connects the incoming call to line 111. In step 409, station set 101 answers the call and voice communication is established between the calling and called party. In step 411, the called party at station 101 signals system 100 of a call transfer to fax machine 103. This call transfer request may be accomplished 1) by pressing a transfer button and dialing the extension line of the fax machine, 2) by pressing a transfer button and pressing a preprogrammed auto-dial button programmed with the fax machine number, 3) pressing a preprogrammed auto-intercom button for the fax machine, or 4) by utilizing combinations of central office or centrex, PBX or key system features. This call transfer request enables a system party to transfer the call to fax machine 103 in response to a request by one of the parties to either send or receive a fax message during the same call connection. In step 413, system 101 transfers the call to (and provides ringing on) line 113 associated with fax machine 103. In step 425, fax machine senses ringing and goes off-hook. In step 427, fax machine 103 checks if a document exists in ADF or if a message is in fax message buffer 251. If no document is in ADF and/or no message has previously been stored, fax machine 103 enters the received fax mode. This is shown in steps 428, 429 and 430. These steps proceed in the conventional manner, in accordance with CCITT Recommendation T.30 (e.g., see the *CCITT Blue Book*, Volume VII-Fascicle VII.3; entitled, Terminal Equipment and Protocols for Telematic Services).

If, however, a document exists in ADF or a message exists in fax message buffer 251, then fax machine 103 enters the transmit fax mode, as shown in steps 431, 432 and 433. In step 431, the fax machine 103 checks if a Digital Identification Signal (DIS) is received. The DIS signal is defined as part of the previously-referenced CCITT Recommendation T.30.

If a DIS signal is not received the process terminates in step 434. If a DIS signal is received, then in step 432 fax machine 103 sends a Digital Command Signal (DCS) in accordance with Recommendation T.30. In step 433 the fax image (stored message or document) is transmitted by fax machine 103.

In a third mode of operation, station 101 originates an outgoing fax call to fax machine 140. This is shown in step 415. In step 417, system 100 sets up the outgoing call over line 111. In step 411, after the call is established, a user at station 101 signals system 100 of a call transfer to fax machine 103. In step 413, system 100 transfers the outgoing call to and provides tinging on line 113. In step 425, fax machine 103 senses ringing and goes off-hook. Since this is an outgoing fax call, in step 427 a document should be in place in ADF or a message previously stored in fax message buffer 251. Consequently, in step 431 fax machine 103 enters the transmit fax mode and the document or stored fax message is transmitted in the conventional manner in steps 432 and 433.

The fourth mode of operation occurs when station 101 originates an outgoing voice call to station 150. This is shown in step 419. In step 421, system 100 sets up the call over line 111. In step 423, voice communications proceeds between station 101 and station 150. Sometime thereafter a user at either station 101 or station 150 decides to send a fax transmission. The user at station 101 signals system 100 to transfer the call to fax machine 103 to enable the reception or transmission of a fax message. In step 413, system 100 transfers the call to and provides ringing over line 113. In step 425, fax machine 103 senses ringing and goes off-hook. If the user at station 101 desires to send a fax message, then fax machine 103 performs the previously-described steps 427, 431, 432 and 433. If, however, the user at station 101 desires to receive a fax message then steps 427 through 430 are performed in the previously described manner.

The operation of the present invention differs from the prior art operations of a fax machine in the following manner. In the prior art, in order to transmit a fax message after answering an incoming call (steps 425, 427), the fax machine would have to be placed in a polling mode (i.e., the calling station wishes to receive). A polling mode requires that the fax machine send the mandatory Digital Identification Signal (DIS) to the polling fax machine. This is shown in step 440. Optionally, depending on the operating mode and in accordance with Recommendation T.30, a Called Subscriber Identification (CSI) signal may precede the DIS and also be sent to the polling remote fax machine 140. In step 442, in accordance with T.30 standards, to enter the polling mode the local fax machine 103 would then expect to receive a Digital Transmit Command (DTC) signal from the remote fax machine. If the DTC signal is received, the local fax machine 103 would then go into the polling mode to transmit the fax message, step 433. Once in the polling mode, step 433, the fax transmit operation of fax machine 103 operates in the standard manner. If no DTC signal was received, in step 442, the local fax machine would then terminate operations in accordance with standard fax machine operations.

While the call transfer operation has been described as requiring the user to press the transfer button and dial the number of fax line 113, other call transfer enabling procedures may be utilized. For example, system 100 may permit a user at station set 101 to switchhook flash and/or dial a prearranged code to activate the call transfer operation. Additionally, it should be noted that the trunk and lines that connect to the customer switching system may, more generally, be wire, optical or radio communication channels or facilities.

While the present invention has been described as utilizing a ring signal to signal the fax machine of an impending call, it should be understood that, more generally, any alerting signal may be utilized. For example the system controller 109 may utilize a proprietary digitally encoded signaling protocol for communicating control, voice and data signals to station sets and fax machine connected thereto. In such an arrangement the line interface of the fax machine would decode these digitally encoded signals (e.g., ring signal) into a signal format utilized by the fax machine.

While the present invention has been described as utilizing a control unit for controlling the connections to station sets and fax machines of the system, the function of said control unit may also be distributed between the station sets and fax machines themselves. Thus, the fax machine and station set may be interconnected in an arrangement where they can signal each other to control network connections to an external fax apparatus or to another fax apparatus of the arrangement. For example, such an arrangement may be implemented in a Local Area Network type configuration.

What has been described is merely illustrative of the application of the principles of the present invention. Other arrangements and methods can be implemented by those skilled in the art without departing from the spirit and scope of the present invention.

We claim:

1. A facsimile (fax) apparatus comprising:
    means for answering a call received over a communication channel connected to said fax apparatus;
    means for detecting the presence of a fax message awaiting to be transmitted from said fax apparatus; and
    means, responsive to said call and a detected presence of said fax message, for transmitting said fax message over said channel without first sending a digital identification signal (DIS) over said channel.

2. The fax apparatus 1 wherein said transmitting means transmits said fax message without first receiving a digital transmit command (DTC) signal over said channel.

3. The fax apparatus of claim 1 further comprising
    means, responsive to an answered call and a detected absence of said fax message, for receiving a fax transmission over said channel.

4. The fax apparatus of claim 1 wherein
    said answering means includes interface means responsive to a predetermined signaling format received over said channel, said interface means adapting said received signaling format to signals compatible with said fax apparatus.

5. The fax apparatus of claim 1 not including dialing means for originating a communication connection over said channel.

6. The fax apparatus of claim 1 wherein said fax message is a document and wherein said detecting means detects the presence of said document in said fax apparatus.

7. The fax apparatus of claim 1 further comprising
    a memory unit for storing said fax message and wherein said detecting means detects the presence of said fax message in said memory unit.

8. The fax apparatus of claim 1 wherein said channel is a first channel and wherein said fax apparatus further comprises
    means for establishing a call connection over a second communication channel, and
    means for sending a transfer control signal over an established second channel call connection, to signal a request for a call connection transfer to said first channel.

9. The fax apparatus of claim 8 wherein said first channel and said second channel are different channels of one communication facility.

10. A communication system comprising
    a control unit for switching a communication connection from a first facility to a second facility in response to a transfer control signal received over said first facility, and for sending an alerting signal over said second facility in response to said transfer control signal;
    a station set connected to said first facility, said station set including means for establishing a connection over said first facility, and
    means for sending said transfer control signal to said control unit to transfer said established communication connection from said first facility to said second facility; and
    a fax apparatus (fax) connected to said second facility, said fax apparatus including,
        means, in response to receiving said alerting signal over said second facility from said control unit, for going off-hook and transmitting a fax message over said second facility without first sending a control signal over said second facility.

11. The system of claim 10 wherein said fax apparatus further includes
    means for detecting the presence of a fax message awaiting to be transmitted from said fax apparatus, and wherein
    said transmitting means is responsive to a fax message present signal from said detecting means for establishing a fax transmit mode to transmit said fax message.

12. The system of claim 11 wherein said fax apparatus includes
    means for receiving a fax message over said second facility and wherein said receiving means is responsive to the absence of said fax message present signal for establishing a fax receive mode.

13. The system of claim 10 wherein said sending means of said station set includes a transfer button for sending said transfer control signal to said control unit.

14. The system of claim 10 wherein said sending means includes a dial pad at said station set for sending said transfer control signal to said control unit.

15. The system of claim 10 wherein said transfer control signal is generated using a single button which signals a call transfer and identifies said second facility which connects to said fax apparatus.

16. The system of claim 10 wherein said station set and said fax apparatus are packaged together as one communication apparatus.

17. The system of claim 10 wherein said alerting signal is a ring signal.

18. The system of claim 10 wherein said alerting signal is a digitally encoded signal.

19. The system of claim 10 wherein said fax machine includes no dialing means.

20. The system of claim 10 wherein said control unit is part of a centrex central office.

21. The system of claim 10 wherein said system is a KEY telephone system.

22. The system of claim 10 wherein said system is a private branch exchange (PBX) system.

23. A method of operating a facsimile (fax) apparatus comprising the steps of:
answering a call received over a communication channel connected to said fax apparatus;
detecting the presence of a fax message awaiting to be transmitted from said fax apparatus; and
in response to said call and a detected presence of said fax message, transmitting said fax message over said channel without first sending a digital identification signal (DIS) over said channel.

24. The method of claim 23 further comprising the step of
in response to a detected absence of said fax message, receiving a fax transmission over said channel.

25. The method of claim 23 wherein said channel is a first channel and wherein said method further comprises the steps of
establishing a call connection over a second communication channel, and
sending a transfer control signal over an established second channel call connection to signal a request for a call connection transfer to said first channel.

26. A method of operating a communication system comprising the steps of
at a control unit, switching a communication connection from a first facility to a second facility in response to a transfer control signal received over said first facility, and
sending an alerting signal over said second facility in response to said transfer control signal;
at a station set connected to said first facility, establishing a connection over said first facility,
sending said transfer control signal to said control unit to transfer said established communication connection from said first facility to said second facility; and
at a fax apparatus connected to said second facility, going off-hook, in response to receiving said alerting signal over said second facility from said control unit, and transmitting a fax message over said second facility without first sending a control signal over said second facility.

27. The method of claim 26 wherein said fax apparatus includes the steps
detecting the presence of a fax message awaiting to be transmitted from said fax machine, and wherein
said transmitting step is responsive to a detected fax message for establishing a fax transmit mode to transmit said fax message.

28. The method of claim 26 wherein said transfer control sending step signals a call transfer operation to said control unit and identifies said second facility to which the communication connection is to be transferred.

29. A facsimile (fax) apparatus comprising:
means for automatically answering a call received over a communication channel connected to said fax apparatus;
means for detecting the presence of a fax message awaiting to be transmitted from said fax apparatus; and
means, responsive to said call and a detected presence of said fax message, for transmitting said fax message over said channel after first receiving a digital identification signal (DIS) over said channel.

30. The fax apparatus of claim 29 wherein said transmitting means transmits said fax message after sending a digital command signal (DCS) over said channel.

31. A method of operating a facsimile (fax) apparatus comprising the steps of:
automatically answering a call received over a communication channel connected to said fax apparatus;
detecting the presence of a fax message awaiting to be transmitted from said fax apparatus;
receiving a digital identification signal (DIS) over said channel; and
in response to a detected presence of said fax message, and a received digital identification signal (DIS) over said call, transmitting said fax message over said channel.

32. The method of claim 31 further comprising the step of
sending a digital command signal (DCS) over said channel, and
wherein said transmitting step transmits said fax message only after sending said digital command signal (DCS) over said channel.

* * * * *